United States Patent [19]
Matt et al.

[11] Patent Number: 6,041,290
[45] Date of Patent: Mar. 21, 2000

[54] METHOD OF ADAPTIVELY ADJUSTING THE COEFFICIENTS OF A DIGITAL FILTER IN AN ECHO CANCELLER

[75] Inventors: Hans Jürgen Matt, Remseck; Michael Walker, Baltmannsweiler; Uwe Ackermann, Freiberg, all of Germany

[73] Assignee: Alcatel, Paris, France

[21] Appl. No.: 08/969,735

[22] Filed: Nov. 13, 1997

[30] Foreign Application Priority Data

Nov. 15, 1996 [DE] Germany .......................... 196 47 276

[51] Int. Cl.[7] ..................................................... H04B 3/20
[52] U.S. Cl. .......................... 702/191; 702/193; 702/194; 702/195; 370/286
[58] Field of Search .................................... 702/189–195; 370/286–290; 379/406–411; 381/71.1, 71.11

[56] References Cited

U.S. PATENT DOCUMENTS

| | | | |
|---|---|---|---|
| 4,629,829 | 12/1986 | Puhl et al. | 455/570 |
| 5,272,695 | 12/1993 | Makino et al. | 370/291 |
| 5,512,959 | 4/1996 | D'Alto et al. | 348/614 |
| 5,570,423 | 10/1996 | Walker et al. | 379/410 |
| 5,818,945 | 10/1998 | Makino et al. | 381/66 |

FOREIGN PATENT DOCUMENTS

| | | |
|---|---|---|
| 0561133 | 9/1993 | European Pat. Off. . |
| 0627840 | 12/1994 | European Pat. Off. . |
| 0719028 | 6/1996 | European Pat. Off. . |
| 4418792 | 11/1995 | Germany . |
| 4445877 | 6/1996 | Germany . |
| 9217004 | 10/1992 | WIPO . |

OTHER PUBLICATIONS

Hun, Tilman, et al, Kombination von Gerauschreduktion und Echokompensation beim Freisprechen, In: Nachrichtentech, Elektron, Berlin 43, 1993, H. 6, pp. 274–280, (German).
JP 07066758 A, Patent Abstracts of Japan, (abstract xlation only).
JP 07074681 A, Patent Abstracts of Japan, (abstract xlation only).
"The Telecommunications Engineer", Science and Life Publishers, Georg Heidecker GmbH Erlangen, 48th year, Oct. 1994, pp. 27–29, (German).

*Primary Examiner*—Marc S. Hoff
*Assistant Examiner*—Craig Steven Miller
*Attorney, Agent, or Firm*—Ware, Fressola, Van Der Sluys & Adolphson LLP

[57] ABSTRACT

Digital filters are used to compensate for echoes in a transmission system in which unwanted couplings occur between a signal value in the receiving direction and a signal value in the transmitting direction. The correct adjustment of the filter coefficients has a considerable influence on the achievable echo compensation. Disturbance signals such as background noises, nonlinear effects in A/D converters or an active local speaker can briefly change the adjustment of the filter coefficients in a way so that the digital filter does not compensate for the echoes and causes additional echoes in unfavorable cases. In accordance with the invention a set of filter coefficients (C(j)) are weighted with an envelope curve (H(j)) and an error measurement (F(j)) is determined therefrom. Depending on the magnitude of the error measurement (F(j)), the filter coefficients (ci) are used for further processing or are discarded. The pertinent arrangement comprises a first digital filter (1) for which the filter coefficients (ci) are continuously calculated in accordance with the NLMS algorithm. These filter coefficients (ci) are stored, weighted and the best values are used to adjust a second digital filter (7) whose output signal (9) is subtracted from the echo-affected signal, creating an echo-free output signal (10) and thus significantly increasing the quality of a natural and undisturbed transmission, even with short-time disturbances.

12 Claims, 8 Drawing Sheets

METHOD OF ADAPTIVELY ADJUSTING THE COEFFICIENTS OF A DIGITAL FILTER IN AN ECHO CANCELLER

TECHNICAL FIELD

The invention concerns a method and an arrangement for adaptive echo compensation in a transmission system in which an unwanted coupling occurs between a signal path in the receiving direction and a signal path in the transmitting direction.

BACKGROUND OF THE INVNETION

Such a method for example finds a technical application for echo suppression during intercom talking, for the transmission of analog or digital signals via long lines or via 2-wire/4-wire converters, and in mobile radio networks with both the DECT standard and the GSM standard.

The basic idea of echo compensation comprises the simulation of a real system, for example the loudspeaker-room-microphone system during intercom talking, see R. Wehrmann et al.: Signal processing method for improving voice communication via intercom stations, The Telecommunications Engineer, Science and Life Publishers Georg Heidecker GmbH, Erlangen, 48th. year, October 1994, pages 27–29. The signal that arrives at the receiver then passes through the real and the simulated system. The echo signal formed by the simulated system is subtracted from the real echo signal, so that the echo is compensated except for a residual error.

Digital filters, particularly FIR (Finite Impulse Response) filters proved to be especially suitable.

According to FIG. 1, an FIR filter 1 essentially comprises a number n of memories 11, . . . , 1n switched in a chain connection, which respectively store a sampled value $x(k-\tau)$ of the input signal, and a number of multipliers 21, . . . , 2n whereby the output signal of each memory 11, . . . , 1n is multiplicatively weighted with a set of filter coefficients $c_i$ where $1 \leq i \leq n$, and a summator 3 which adds all the weighted signals to an output signal 4. The filter coefficients $c_i$ must be adjusted so that the FIR filter 1 simulates a signal that corresponds to each real echo, which is then subtracted from the disturbed signal to eliminate the echoes. Generally the echoes can only be simulated by the FIR filter 1 with limited accuracy by expending a practical effort, so that the echo cannot be entirely eliminated from the disturbed signal and thus no complete echo compensation can be achieved but rather only an echo attenuation.

In this case the correct adjustment of the filter coefficients $c_i$ exerts a significant influence on the achievable echo attenuation. It can be attained once with accurate measuring means. But such a process has the disadvantage that a new measurement must be performed with each change of the real echo, and a new adjustment of the filter coefficients $c_i$ is required.

It is known to carry out a continuous measurement with an automatic adjustment of the filter coefficients $c_i$ in accordance with the NLMS (Normalized Least Mean Square) algorithm, see R. Wehrmann et al.: Signal processing method for improving voice communication via intercom stations, The Telecommunications Engineer, Science and Life Publishers Georg Heidecker GmbH, Erlangen, 48th. year, October 1994, pages 8–10. The filter coefficients $c_i(k)$ at the time k are calculated from those at the time (k−1) in accordance with (see equation 1), $$(1) \quad ci(k) = ci(k-1) + \alpha \frac{y(k) \cdot x(k-\tau-i)}{\sum_{q=1}^{n} x^2(k-\tau-q)}$$

where:
$ci(k)$=i-th filter coefficients at time k
$\alpha$=step size $0<\alpha \leq 2$
$y(k)$=sampled value of the microphone signal with attenuated echo at time k
$\tau$=the smallest delay after an excitation until an echo occurs; corresponds to the shortest signal transfer time from loudspeaker to microphone
n=length of the filter
$x(k-\tau-i)$=sampled value of the loudspeaker signal
$\Sigma x(.)$=signal energy in the filter.

The filter coefficients c can be adjusted quickly and with sufficient accuracy by the NLMS algorithm if no other disturbance signals are present except for the echoes. The adjustment speed is essentially determined by the step size $\alpha$. If the step size $\alpha$ is small, the adjustment speed is small; it increases as the step size $\alpha$ increases and reaches its largest value when $\alpha$=2. Good convergence properties are attained with the NLMS algorithm if the echoes have a uniform broad-banded power density spectrum.

With unsuitable excitation, for example by sinusoidal signals and in the presence of disturbance signals, for example when the local speaker talks, the filter coefficients $c_i$ are misadjusted by the NLMS algorithm. The larger the step size $\alpha$ is, the faster this takes place. To prevent such a misadjustment of the filter coefficients $c_i$ it is known to control the magnitude of the step size $\alpha$ as a function of the current signal situation in order to be able to use a signal situation that is suitable for the NLMS algorithm for determining the filter coefficients $c_i$, see DE 44 30 189.

Still, signal situations which lead to misadjustments of the filter coefficients $c_i$ occur despite the adaptive control of the step size $\alpha$. A signal situation which is particularly unfavorable for the NLMS algorithm occurs if disturbance signals caused by external disturbance sources take place in addition to the echoes at the output of the microphone, signal ms(t) in FIG. 1. Such disturbance signals can be produced for example by an active local speaker, or by background noises, or by nonlinear effects in A/D (analog-to-digital) converters, or by non-harmonic resonances of loudspeakers and their cabinets. For the short term these disturbance signals can change the adjustment of the filter coefficients $c_i$ in a way so that the FIR filter does not compensate for existing echoes and even causes additional echoes in unfavorable cases, thereby deteriorating the entire situation. Even a good average echo attenuation, for example 30 dB does not exclude phases wherein the FIR filter clearly causes additional disturbances, so that a natural voice transmission is no longer provided and in certain applications the intercom stations are entirely omitted, for example during conference operations.

SUMMARY OF THE INVENTION

The result is the task of presenting a method and an arrangement for the echo compensation which makes it possible, when using the NLMS algorithm to determine the filter coefficients $c_i$ for a digital filter, to determine the current filter coefficients even during short-time disturbances, so that a misadjustment of the digital filter is avoided and a natural voice transmission is provided.

The invention fulfills this task by a method of adaptive echo compensation with a digital filter whose number n of filter coefficients, or briefly its set of filter coefficients, is calculated in accordance with the Normalized-Least-Mean-Square algorithm, in a transmission system in which a coupling occurs between a signal path in the receiving direction and a signal path in the transmitting direction, wherein the set of filter coefficients is compared to an envelope curve, an error measurement is calculated from the variation between the values of the set of filter coefficients and those provided by the envelope curve, only the set of filter coefficients in which the error measurement drops below a threshold value is used further to adjust the digital filter.

The invention also fulfills this task by an arrangement for the adaptive echo compensation with a first digital filter and a unit for calculating the set of filter coefficients in accordance with the Normalized-Least-Mean-Square algorithm, wherein the first digital filter is assigned a unit for storing at least one set of filter coefficients, for calculating at least one error measurement and for selecting the set of filter coefficients with an error measurement which drops below a defined threshold value, whose output is connected to a second digital filter for loading the selected set of filter coefficients into the second digital filter, whose output is switched to a summing circuit wherein the output signal of the second digital filter is subtracted from the analog-to-digital converted echo-affected signal, thus producing an echo-compensated signal.

The essence of the invention is that an error measurement is determined by comparing a set of filter coefficients with an envelope curve, and that the error measurement is used as the basis for selecting a set of filter coefficients which favors the adjustment of the FIR filter.

BRIEF DESCRIPTION OF THE DRAWINGS

The invention will now be explained with a configuration example, where the pertinent drawings are.

BEST MODE FOR CARRYING OUT THE INVENTION

Figure 1:
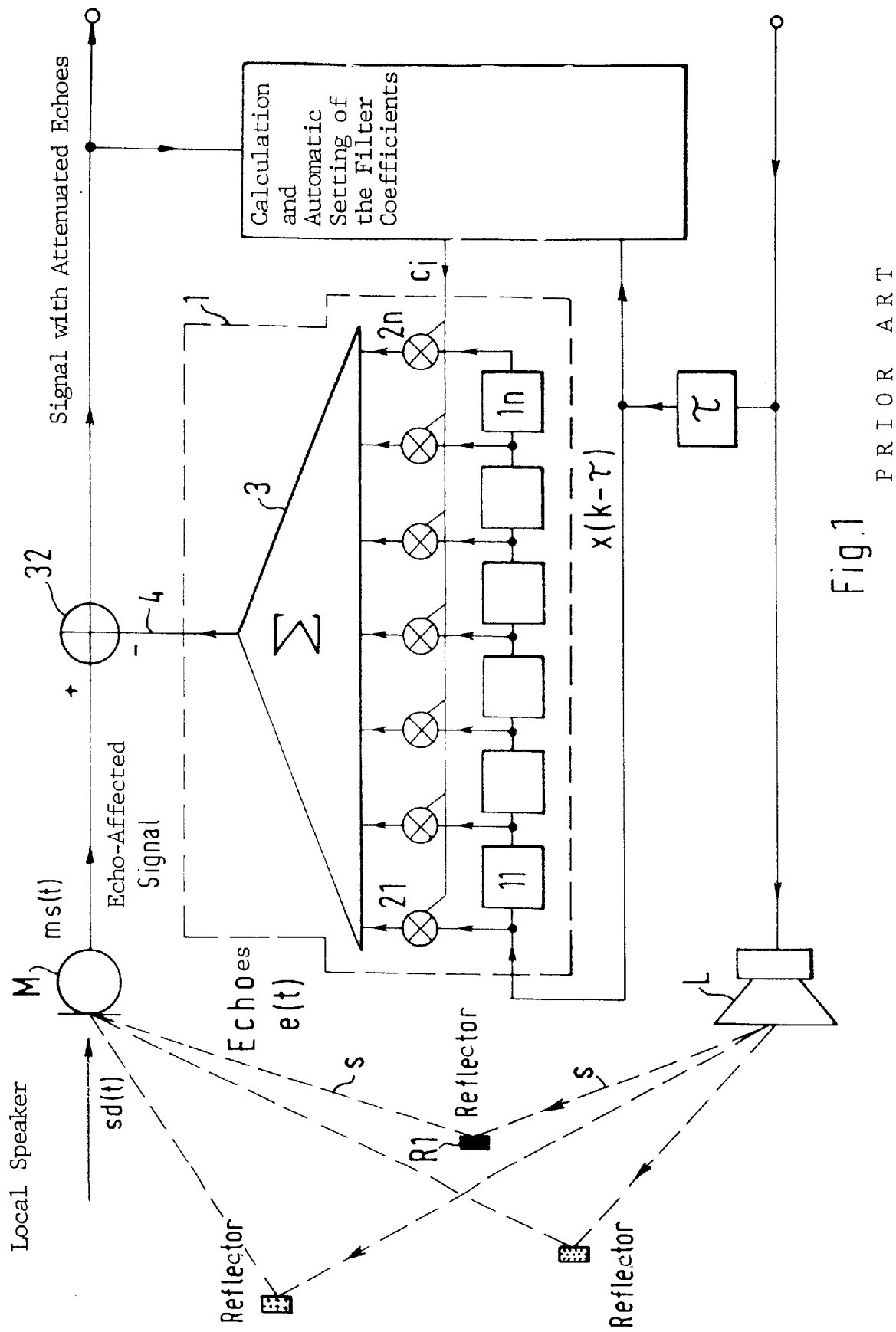
FIG. 1 an intercom arrangement according to the known state of the art with an adaptive FIR filter.

FIG. 1 illustrates the occurrence of echoes with the example of an intercom station in a telecommunications terminal. Echoes occur during intercom talking in that a signal from a loudspeaker L collides with an object in a room, from where it is reflected and reaches a microphone M. In that case the signal traverses a path s from loudspeaker L to the microphone M via a reflector R1, and continuously loses energy. A time t corresponds to the traversed path s and is the time it takes the signal to arrive from the loudspeaker L to the microphone M. It is:

$$s = v \cdot t \text{ where } v = \text{sound speed.} \tag{2}$$

The sound pressure level sd(t) at the microphone M decreases in inverse proportion to the path s of the echo and also in inverse proportion to the travel time t of the echo. The electrical microphone signal ms(t) at the output of the microphone M is proportional to the sound pressure level sd(t). This means that:

$$sd(t) \sim s \; sd(t) \sim t^{-1} \text{ and} \tag{3}$$

$$ms(t) \sim sd(t), \text{ i.e. } ms(t) \sim t^{-1}. \tag{4}$$

Figure 2:
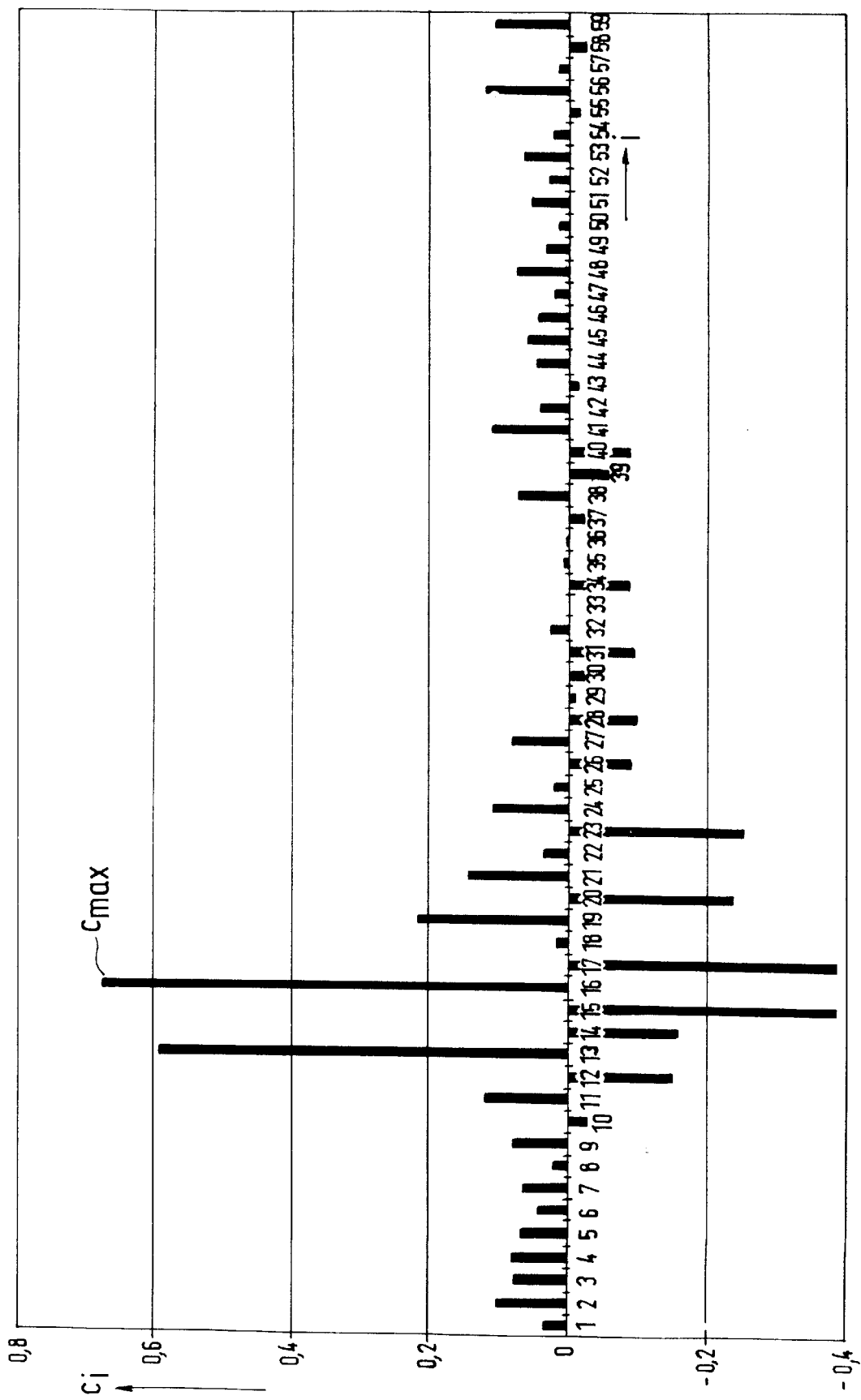
FIG. 2 a diagram with a typical course of the filter coefficients $c_i$ at a time k as the function of i for a correct filter adjustment.

For that reason the diagrams of the adjustments of filter coefficients c due to echoes show a typical course as illustrated in FIG. 2. For a predetermined ix, such a course always has a largest filter coefficient $|c_{ix}| = c_{max}$ under the first filter coefficients $c_i$, whose magnitude is derived from the sound which travels directly from the loudspeaker L to the microphone M. Starting from this maximum filter coefficient $c_{max}$, all further filter coefficients $c_i$ become smaller, because as a rule they correspond to reflections whose paths are longer than the direct path from the loudspeaker L to the microphone M. The amounts of the correctly adjusted filter coefficients $c_i$ must therefore be within an envelope curve which decays in accordance with equation (3) because of the time distance between them, which corresponds to an increasing distance from the microphone M. An overstepping of this envelope curve very probably shows a misadjustment of one or several filter coefficients $c_i$. Since echoes do not occur at all moments in time, some filter coefficients $c_i$ can be very small or zero.

Figure 3:
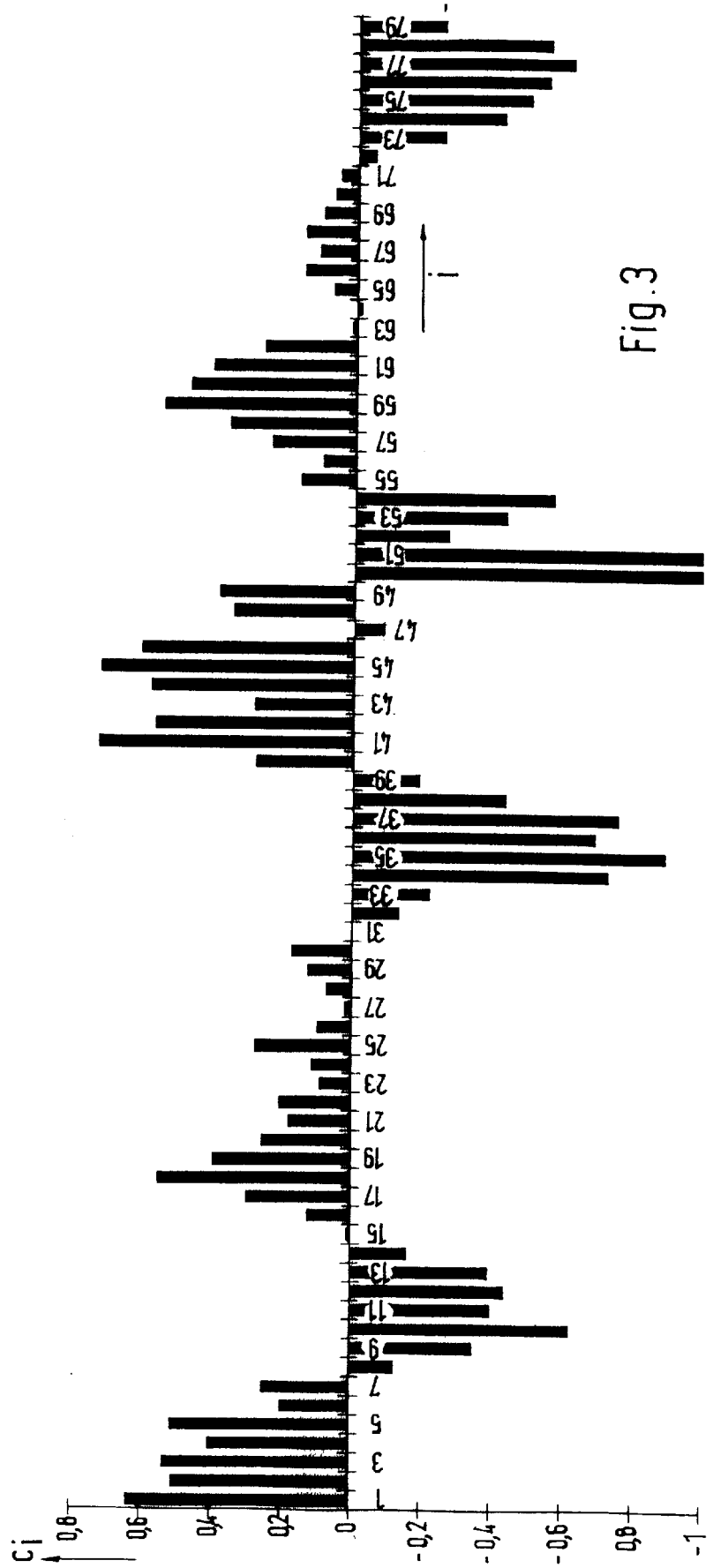
FIG. 3 a diagram with a typical course of the filter coefficients $c_i$ at a time k as the function of i for a bad filter adjustment.

An example of a typically poor adjustment of the filter coefficients $c_i$ is illustrated in FIG. 3. The course of the values of filter coefficients $c_i$ fluctuates heavily. Several maximums take place in addition to an absolute maximum. In the broadest sense the envelope curve of the values of filter coefficients $c_i$ resembles a decaying sinus function.

The invention now calculates a probable envelope curve for the amounts of the values of filter coefficients $c_i$ and then checks whether the amounts of the values of filter coefficients $c_i$ lie within this envelope curve, or if they vary therefrom. The envelope curve of the filter coefficients $c_i$ in FIG. 4 thus provides a priori values of a higher probability. FIG. 5 illustrates the course of filter coefficients 51 according to an envelope curve in comparison to a course of the amounts of filter coefficients 52 such as can occur in practice.

The probable course of the envelope curve of the filter coefficients $c_i$ can be estimated from the physical boundary conditions according to equations (2), (3) and (4), and the time distance Ta between the consecutive filter coefficients $c_i$ and $c_{i-1}$. It is furthermore assumed that the envelope curve passes through the maximum filter coefficient $c_{imax}$. The time distance Ta results from the sampling frequency fa according to:

$$Ta = 1/fa \tag{5}$$

and from there the course of envelope curve H(j) at time j $$H(j) = h1(j), h2(j), h3(j), \ldots, hn(j). \tag{6}$$

Because hi(t)~ms(t) and hi(t)~s(t),
at the time k h(k)~(i·v·Ta),
furthermore it must be that h(k)i=ix=cmax(k). From this follows (see equation (7)).

$$(7) \quad hi(j) = \begin{cases} c_{max}(j)\dfrac{ix - i_0}{i - i_0} & \text{for } ix \leq i \leq n \\ 0 & \text{for } i < ix \end{cases}$$

Figure 4:
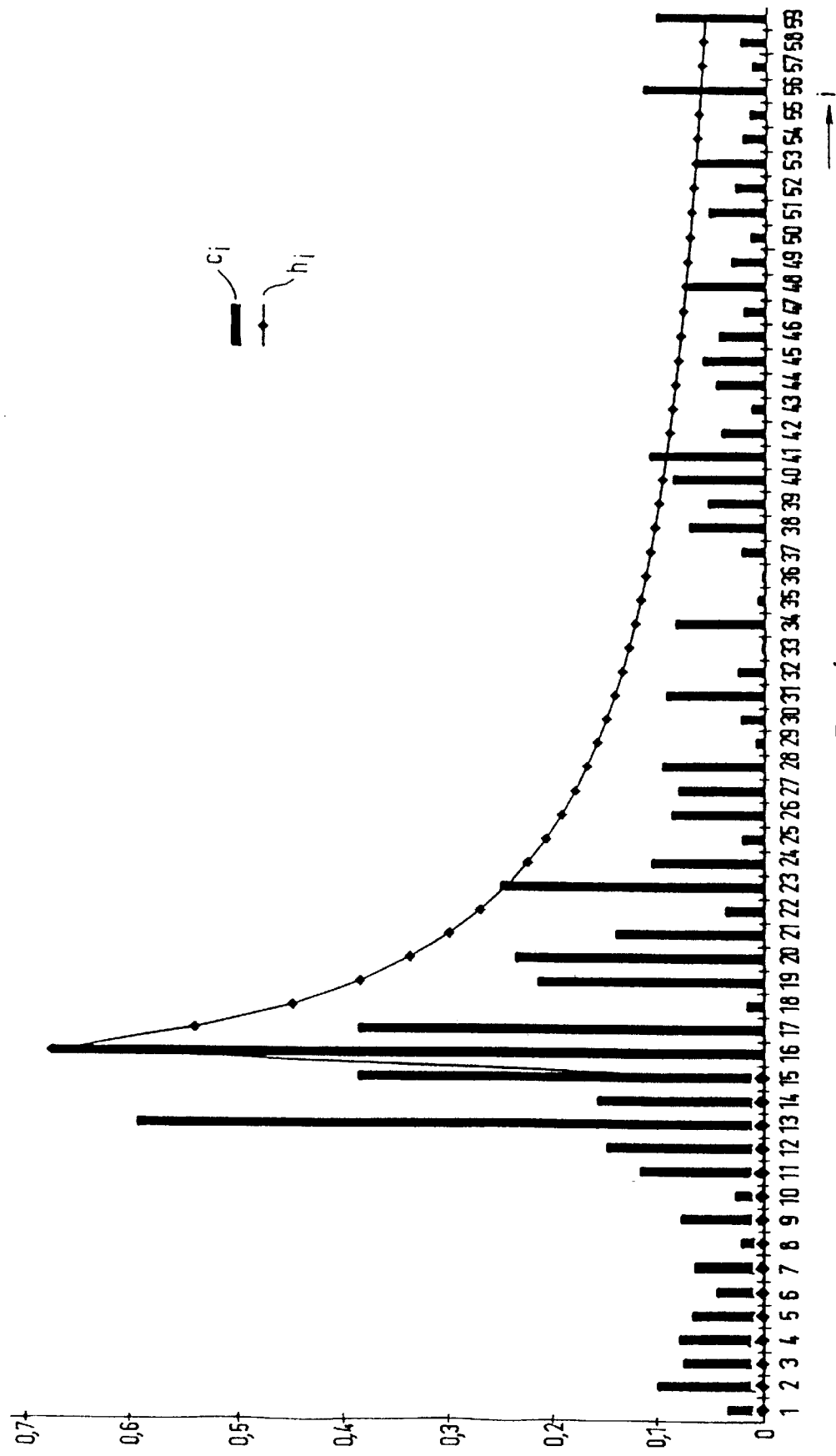
FIG. 4 diagram for a course of the amounts of filter coefficients $c_i$ which is limited by an envelope curve calculated in accordance with equation (7).
Figure 5:
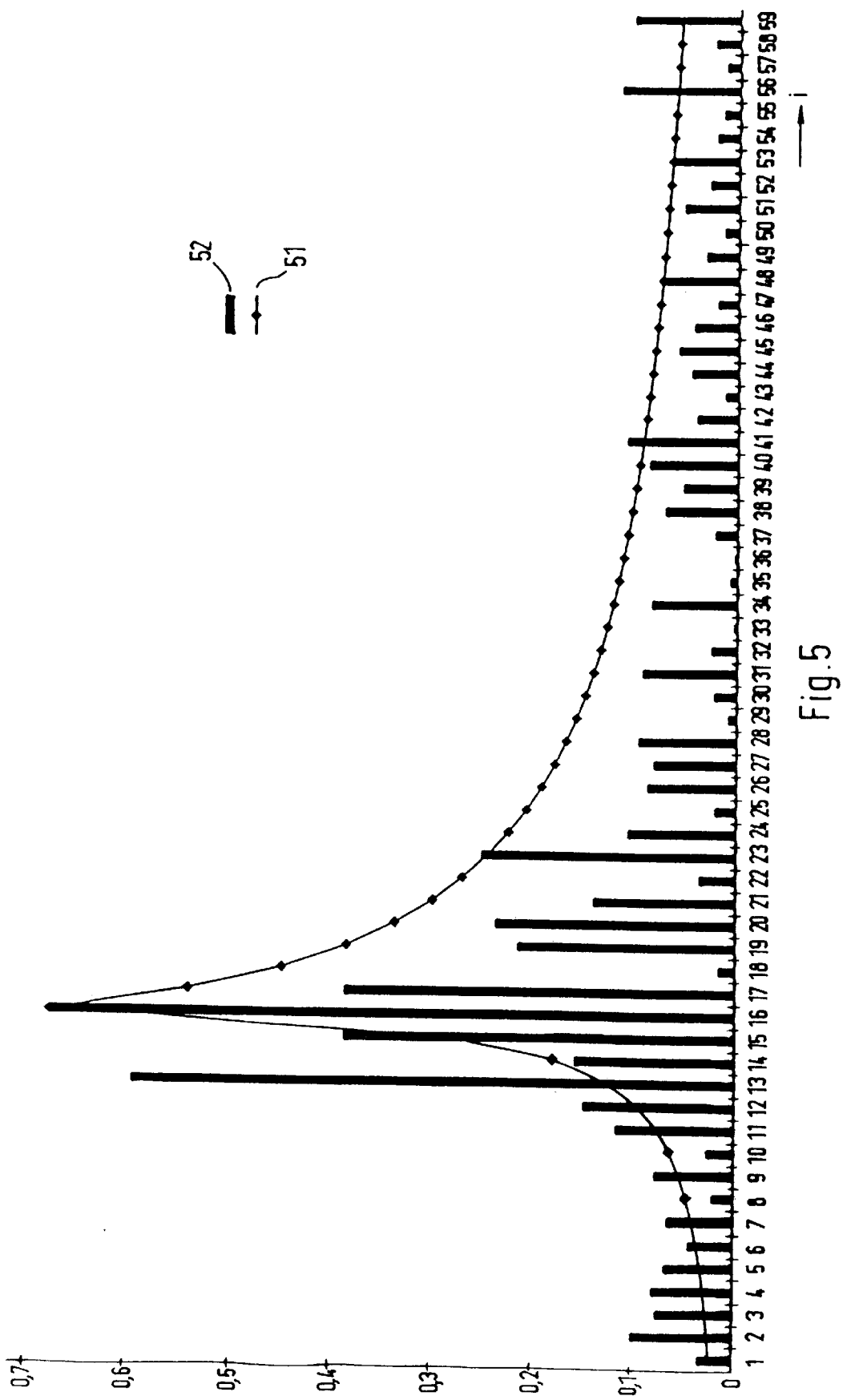
FIG. 5 diagram for a course of the amounts of filter coefficients $c_i$ which is limited by an envelope curve calculated in accordance with equation (8).

A typical course of such an envelope curve is shown in FIG. 4. In that case the value i0=0 when the starting value i of the measurement of filter coefficients ci is known and is equal to zero.

Since it is often not known where the precise zero point i=i0 of a measurement of filter coefficients ci is located, for example when the distance between the loudspeaker L and the microphone M is not known, this i0 value must be estimated. The estimate of the i0 value is made from particularly good measurements, namely when the course of the envelope curve corresponds as well as possible to the actual course of the filter coefficients ci. In FIG. 4 i0=12.

Since the largest filter coefficient cmax corresponds to the direct coupling between loudspeaker L and microphone M, and therefore its position ix, which in FIG. 4 is ix=16, marks a measure for the shortest path of an echo, all filter coefficients ci to which i≦ix applies must be very small. Therefore in equation (7) hi(j)=0 when i<ix.

This is often not so with real systems. It makes sense therefor to expand the method and for further steps of the method also take into account the variations of the filter coefficients ci from the zero value or from a probable envelope curve. In addition, an appropriate heuristic envelope curve is indicated for these filter coefficients ci, which provides an a priori probability that further filter coefficients ci with a smaller magnitude can exist for i<ix in the immediate proximity of cmax, as illustrated in FIG. 2. For that reason a rapidly, for example exponentially dropping curve is assumed here as follows: (see equation (8).

$$(8) \quad hi(j) = \begin{cases} c_{max}(j)\dfrac{ix - i_0}{i - i_0} & \text{for } (ix + 1) \leq i \leq n \\ c_{max} & \text{for } i < ix \\ c_{max}(j)\dfrac{1}{(ix - i + 1)^p} & \text{for } i < ix \wedge p \geq 1 \end{cases}$$

FIG. 5 shows the course of the envelope curve according to equation (8) where ix=16, i0=12 and p=1.2.

Thus equations (7) and (8) show different possibilities of an envelope curve definition across the entire range of filter coefficients ci with a maximum at ix.

In the case where several acoustical paths with different sound speeds exist in a predetermined arrangement of loudspeaker L and microphone M, a superimposed envelope curve Hü(j) is determined, which is done by superimposing the envelope curve H2(j) for the sound speed v2 over the envelope curve H1(j) for the sound speed v1.

Such a situation exists for example if the sound from loudspeaker L impinges on the microphone M through both the terminal cabinet itself at the sound speed v1, as well as through the air at the sound speed v2, when V1>v2 applies.

Figure 8:
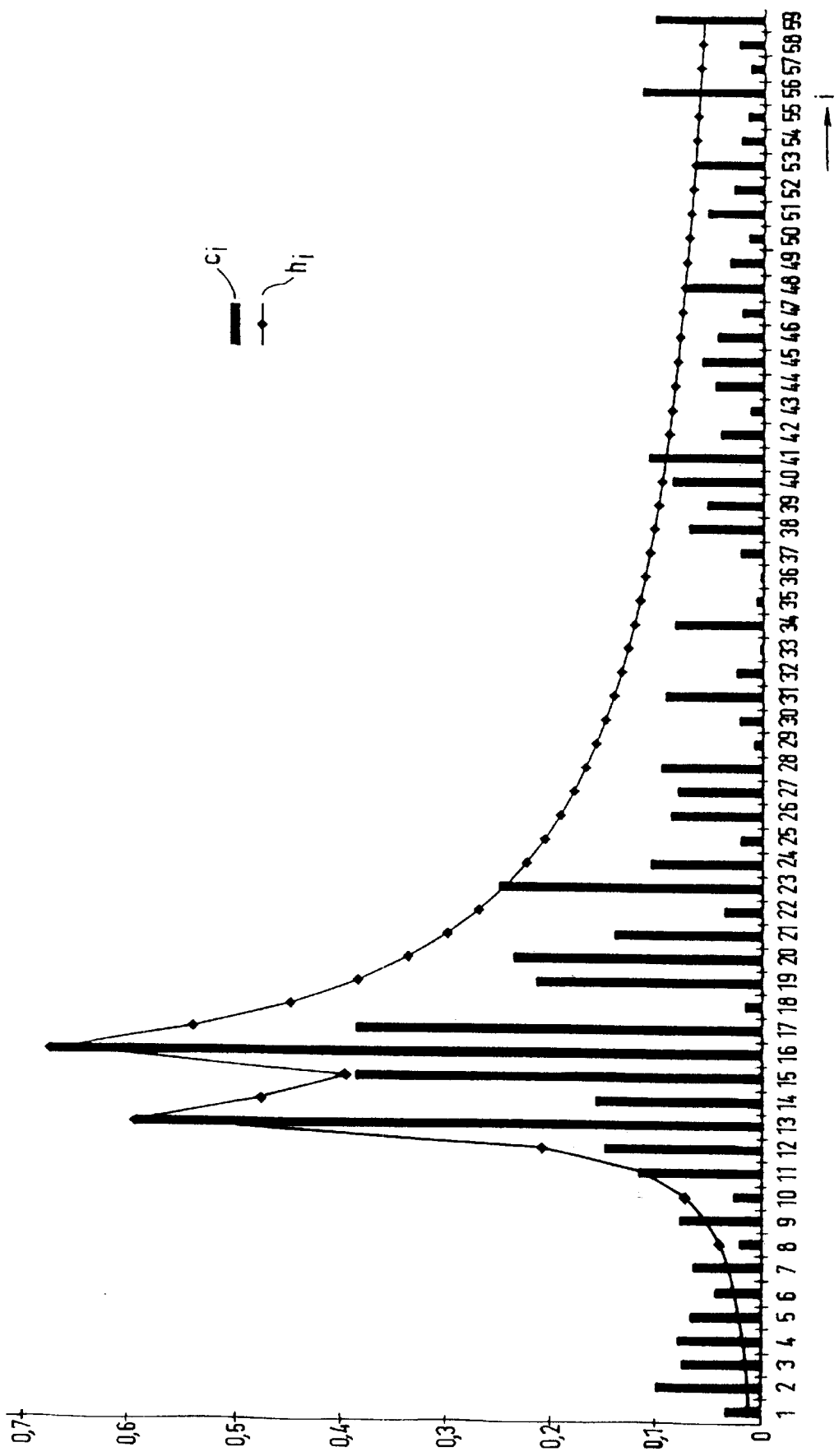

As illustrated in FIG. 8, in that case two maximum filter coefficients of different magnitudes cmax1 and cmax2 are measured, where ix1=16 and ix2=13. Its own envelope curve H1(j) and H2(j) can then be calculated for each of these cmax values, with:

$$H1(j) = \{h11(j), h12(j), \ldots, h1n(j)\} \text{ and} \quad (8a)$$

$$H2(j) = \{h21(j), h22(j), \ldots, h2n(j)\}.$$

The resulting envelope curve Hü(j) is formed according to $$Hü(j) = \{hü1(j), hü2(j), \ldots, hün(j)\} \quad (8b)$$

where $hüi(j) = \max\{hi1(j), hi2(j), \ldots, hin(j)\}$.

An error measurement F(j) for a set of filter coefficients C(j) at time j is now defined from the variations of an envelope curve according to $$C(j) = \{c1(j), c2(j), c3(j), \ldots, cn(j)\} \quad (9)$$

which is formed from the sum of the squares of the partial errors fi(j) or from the amounts of the partial errors fi(j) themselves as follows: (see equation (10)

$$(10) \quad Fa(j) = \sum_i f_i^2(j) \sqrt{\phantom{x}}$$

$$Fb(j) = \sum_i |f_i(j)|$$

with the values for the partial errors fi(j) over all filter coefficients ci (see equation 11)

$$(11) \quad fi(j) = \begin{cases} |c_i| - h_i & \text{when } |c_i| - h_i > 0 \text{ and } 1 \leq i \leq n \\ 0 & \text{otherwise} \end{cases}$$

or values for the partial errors fi(j) only over the filter coefficients ci to which i>ix applies, (see equation 12)

$$(12) \quad fi(j) = \begin{cases} |c_i| - h_i & \text{when } |c_i| - h_i > 0 \text{ and } ix \leq i \leq n \\ 0 & \text{otherwise} \end{cases}$$

or values for the partial errors fi(j) only over the part of filter coefficients ci where i>i1 with i1~(1, . . . , 2)·n/3, (see equation 13)

$$(13) \quad fi(j) = \begin{cases} |c_i| - h_i & \text{when } |c_i| - h_i > 0 \text{ and } i_1 \leq i \leq n \\ 0 & \text{otherwise} \end{cases}$$

Thus an error measurement Fa(j) or Fb(j) can be continuously determined for each set of filter coefficients C(j), which is used as a measure of the quality of this set of filter coefficients C(j).

Figure 6:
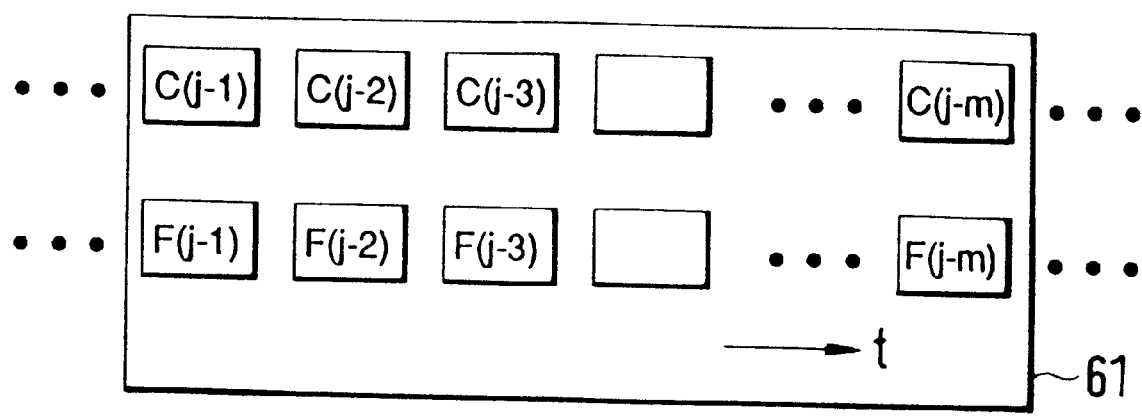
FIG. 6 an illustration of a time window with a number of consecutive sets of filter coefficients with the respective pertinent error measurements.

According to FIG. 6, consecutive sets of filter coefficients C(j)={C(j-1); C(j-2); C(j-3); . . . ; C(j-m)} are stored within a time window 61 of length m, while a probable envelope curve H(j) is estimated for each set of filter coefficients C(j), and thus a respective pertinent error measurement F(j)={F(j-1); F(j-2); F(j-3); . . . , F(j-m)} is calculated and also stored.

Within the time window 61 of length m, the set of filter coefficients C(j)opt with the smallest error measurement (F(j)min is selected and processed further. This selection is made continuously. With each time step a pair of values of filter coefficients C(j) and error measurement (F(j) drops out of the time window 61, and a new pair is picked up.

Combined they form the following method course:
1. Continuous calculation of sets of filter coefficients C(j) according to the NLMS algorithm.
2. The largest filter coefficient Cmax and its position in time i=ix are determined for each set of filter coefficients C(j), so that a probable envelope curve H(j) and a pertinent error measurement F(j) can be calculated therefrom.

3. Sequential sets of filter coefficients C(j) with the pertinent error measurements F(j) are stored during a time interval m.

4. The set of filter coefficients C(j)opt having the smallest error measurement F(j)min is selected within the time window of length m, i.e. x is determined from:

$$F(x)=\min\{F(j-m+1); F(j-m+2); \ldots ; F(j)\} \quad (14)$$

and the pertinent set of filter coefficients $$C(j=x)=C(j)opt \quad (15)$$

is selected as optimum and processed further for the subsequent echo compensation, so that a space for a new current set of filter coefficients C(j) is made available in the time window.

Figure 7:
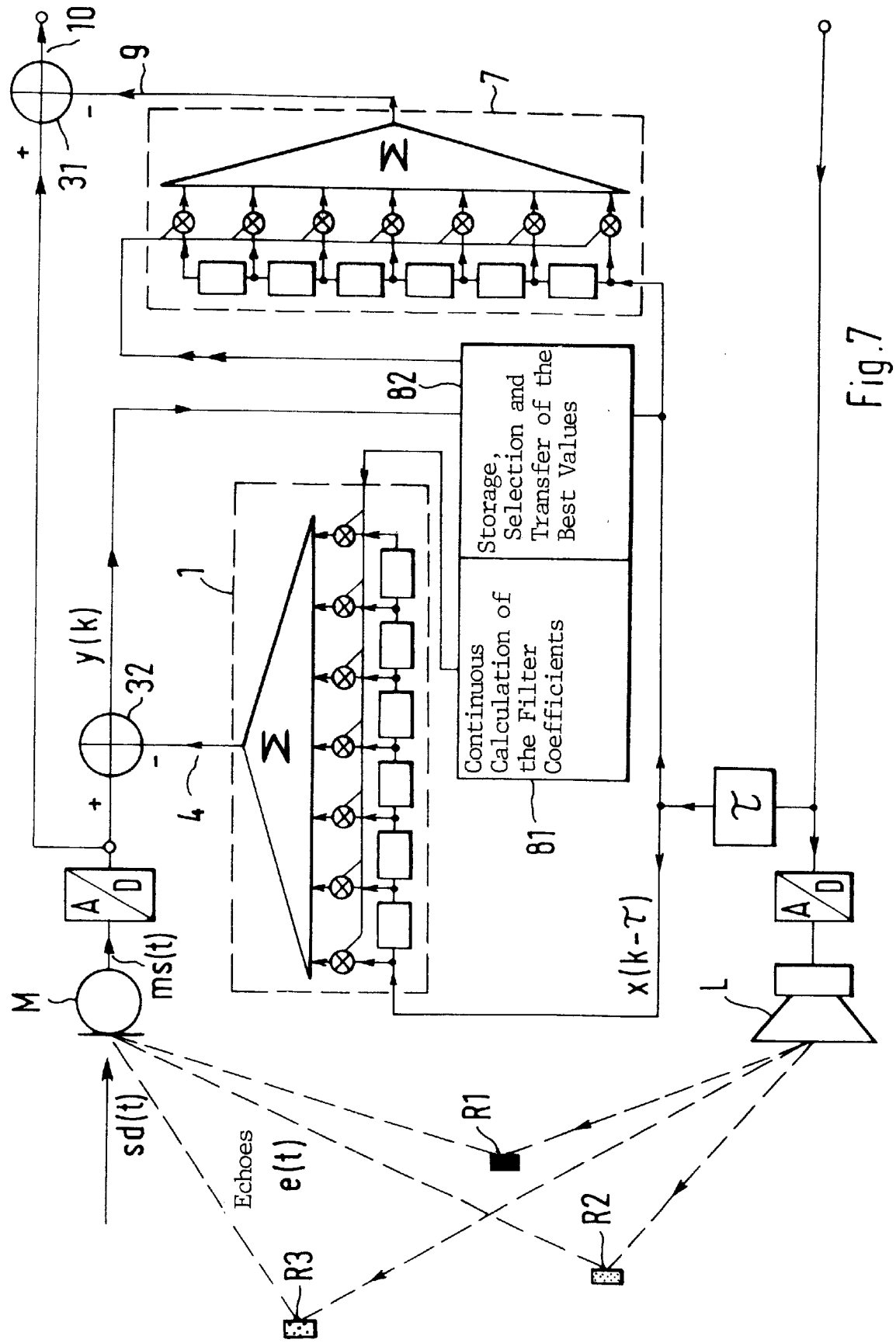
FIG. 7 a diagram of a circuit arrangement for carrying out the method of the invention, and FIG. 8 a diagram for a course of the amounts of filter coefficients $c_i$ on an acoustic path with different sound speeds with a resulting superimposed envelope curve.

A circuit arrangement illustrated in FIG. 7 is used for the technical achievement of the method. To compensate for an echo e(t) traveling in a disturbed environment from the loudspeaker L via a reflector R1 to the microphone M, the circuit arrangement comprises a first digital filter 1, a second digital filter 7 and a unit 8 for calculating the sets of filter coefficients C(j) and for storing and selecting the best values of the sets of filter coefficients C(j)opt. The first digital filter 1 is used to continuously calculate the filter coefficients ci for the input signal x(k−τ) in accordance with the NLMS algorithm. The output signal of the first digital filter 1 is subtracted from the echo-affected and analog-to-digital converted signal of the microphone M, and produces a signal y(k) which could however still contain an error and is therefore not processed further. The storage and selection of the sets of filter coefficients C(j) takes place in the unit 8. The respective optimum set of filter coefficients C(j)opt in the memory is loaded into the second digital filter 7, whose output signal 9 is subtracted from the analog-to-digital converted, echo-affected signal of the microphone ms(t). In this way an output signal 10 is formed which is essentially free of echoes in a disturbed environment.

It is possible to reduce the storage effort to carry out the method, by not storing all sets of filter coefficients C(j) with the pertinent error measurements (F(j) in the time window 61, but only those in which the error measurement (F(j) is smaller than a predetermined threshold value thrs. In this way the sets of filter coefficients C(j) which are not suitable for further processing are already dropped before they are stored.

In a further variation of the realization, the second digital filter 7 can be omitted. To that end only a current set of filter coefficients C(j) with the pertinent error measurement (F(j) is temporarily stored in a memory field if the error measurement (F(j) is smaller than a predetermined threshold value thrs, i.e. F(j)<thrs. In that case a previously stored set of filter coefficients C(j−q) is overwritten. If the error measurement F(j) exceeds the predetermined threshold value thrs, the current set of filter coefficients C(j) is not stored and the last stored set of filter coefficients C(j−q) which fulfilled the condition F(j−q)<thrs is immediately loaded back into the first digital filter 1. This set of filter coefficients C(j−q) is then used to continue the calculation.

It is possible to reduce the effort of calculating the error measurement F(j) and thereby also accelerate the calculation, if the fact is used that the values of the filter coefficients ci, with the correct adjustment of the digital filter starting from a maximum value cmax=cix, and derived from an echo with the shortest return path, must continuously become smaller. With a total number n of filter coefficients ci, the values of filter coefficients ci become especially small if ix<i1, where i1≈n/3 and i1<i<n. In this way a simplified error measurement F(j) can be defined by calculating only the error values fi according to equations (10) and (13) for which ≈n/3<1≦n applies, i.e. the error values fi for filter coefficients ci with higher ordinal numbers.

A further simplification is possible if instead of the error values fi, the values of filter coefficients ci are directly used to calculate the error measurement F(j). In that case the calculation of the values hi for the envelope curve is omitted. The simplified error measurements are then calculated in accordance with the following equations: see (equation 16).

$$(16) \quad Fa(j) = \sum_i c_i^2(j) \bigvee$$

$$Fb(j) = \sum_i |c_i(j)| \quad \text{where} \quad \frac{n}{3} \leq i \leq n$$

The limit n/3 of the inequation is not critical, it can also be 2·n/3. But it must be ensured that the number of filter coefficients ci used for the calculation is greater than ten. Under the indicated conditions, the error measurement F(j) defined in this manner detects misadjustments of the set of filter coefficients C(j) with sufficient accuracy. The threshold value thrs which must be established to weight the error measurement F(j), is adapted to the calculation method of the error measurements F(j) according to equations (10) and (14) respectively.

After the position ix has been determined for the maximum value of the filter coefficient cmax, all the filter coefficients ci for which i≦ix applies can be reduced at least in time, or set to zero. All filter coefficients ci are calculated periodically to detect rapid changes in the position of loudspeaker L and microphone M and of reflectors R1, R2 and R3. From there the respective maximum current value of the filter coefficient cmax and its position ix are determined, and the filter coefficients ci for which i<ix applies are then reduced for a short time, or are set to zero. To reduce the filter coefficients ci it is recommended to weight them with the envelope curve hi(k) while keeping the sign of the filter coefficients ci according to:

$$ci(k)korr=\text{sign}[ci(k)]\cdot hi(k) \quad \text{when } i \leq ix \quad (17)$$

In a further configuration of the invention, the determination of the filter coefficients ci is made a function of the estimated envelope curve hi(k) in accordance with the modified equation (1): (see equation 18).

$$(18) \quad ci(k) = ci(k-1) + \alpha \frac{y(k) \cdot x(k-\tau-i)}{\sum_{q=1}^{n} x^2(k-\tau-q)} \cdot hi(k)$$

A further possibility for the optimum determination of filter coefficients ci consists in replacing misadjusted filter coefficients ci with a better estimated value. Filter coefficients ci whose amount far exceeds the envelope curve are probably grossly misadjusted. A better estimated value for these filter coefficients ci exists if only the sign of the filter coefficients ci is kept and its amount is replaced by the value of the envelope curve hi(k). To that end a check is made for example whether the amount of a filter coefficient ci is more than z-times larger than the pertinent value hi of the envelope curve. In the affirmative case its amount is reduced to the value hi of the envelope curve, i.e.:

if $|c_i(k)|>z \cdot hi(k)$, then $ci(k)=\text{sign}\,[ci(k)] \cdot hi(k)$ when $1<z<3$ for example. (19)

From the ratio of the echo-affected signal to the signal with the attenuated echo at the first summing circuit 32 which is assigned to the first digital filter 1, see FIG. 1 and FIG. 7, and/or at the second summing circuit 31 which is assigned to the second digital filter 7, see FIG. 7, a measure of quality can be respectively derived for the echo compensation, which can be used in addition to the error measurement to control a properly adjusted digital filter and to control the step size $\alpha$ of the NLMS algorithm.

Depending on the type and the magnitude of the disturbances in the environment of a telecommunications terminal, the invention can be used to indicate adapted and cost-effective solutions for the effective compensation of echoes.

What is claimed is:

1. A method of adaptive echo compensation with a digital filter whose number n of filter coefficients ($c_i$), or briefly its set of filter coefficients (C(j)), is calculated in accordance with the Normalized-Least-Mean-Square algorithm, in a transmission system in which a coupling occurs between a signal path in the receiving direction and a signal path in the transmitting direction, characterized in that the set of filter coefficients (C(j)) is compared to an envelope curve (H(j)), an error measurement (F(j)) is calculated from the variation between the values of the set of filter coefficients (C(j)) and those provided by the envelope curve (H(j)), only the set of filter coefficients (C(j)) in which the error measurement (F(j)) drops below a threshold value is used further to adjust the digital filter.

2. A method as claimed in claim 1, characterized in that the course of the envelope curve (H(j)) is calculated for a digital filter with a number n of filter coefficients (ci) as a function of the greatest value (cmax) of the filter coefficients (ci) and its position in time (i=ix), and that the greatest value (cmax) of the set of filter coefficients (C(j)) is a value of the envelope curve (H(j)).

3. A method as claimed in claim 1, characterized in that the error measurement (F(j)) is calculated from the sum of the absolute amounts of variations or from the sum of the squares of the variations between the filter coefficients (ci) values and the values (hi) of the envelope curve (H(j)).

4. A method as claimed in claim 3, characterized in that the error measurement (F(j)) is calculated from the variations between a part of the filter coefficients (ci) of the set of filter coefficients (C(j)), and the values (hi) of the envelope curve (H(j)).

5. A method as claimed in claim 1, characterized in that the error measurement (F(j)) is calculated from the sum of the absolute amounts of positive variations or from the sum of the squares of positive variations between the filter coefficients (ci) values and the values (hi) of the envelope curve (H(j)).

6. A method as claimed in claim 5, characterized in that the error measurement (F(j)) is calculated from the variations between a part of the filter coefficients (ci) of the set of filter coefficients (C(j)), and the values (hi) of the envelope curve (H(j)).

7. A method as claimed in claim 6, characterized in that the error measurement (F(j)) is calculated from variations between the filter coefficients (ci) with a large ordinal number i within the set of filter coefficients (C(j)), and the values (hi) of the envelope curve (H(j)).

8. A method as claimed in claim 1, characterized in that for the duration (m) of a time window a number of sets of filter coefficients (C(j−1), (C(j−2), . . . , C(j−m)) with the pertinent error measurements (F(j−1), (F(j−2), . . . , (F(j−m)) are temporarily stored in a memory (82), and that the set of filter coefficients (C(j)) with the respectively smallest error measurement is read-out from this memory (82) for further processing.

9. A method as claimed in claim 1, characterized in that a current set of filter coefficients (C(j)) is calculated and an error measurement (F(j)) is determined for a first digital filter (1), that the set of filter coefficients (C(j)) with the corresponding error measurement (F(j) is temporarily stored in a memory (82), and that from a number of sets of filter coefficients (C(j)) in the memory (82) the one with the smallest error measurement (F(j)) is loaded into a second digital filter (7), whose output signal (9) is used for the echo compensation of an echo-affected signal (ms(t)).

10. A method as claimed in claim 1, characterized in that a set each of filter coefficients (C(j)) with the pertinent error measurement (F(j) is temporarily stored if the error measurement (F(j) drops below a defined threshold value (thrs), and that when a current set of filter coefficients (C(j)) occurs with an error measurement (F(j) which has dropped below the defined threshold value (thrs), it is loaded back into the digital filter for further processing.

11. A method as claimed in claim 1, characterized in that the values of the set of filter coefficients (C(j)) which exceed the values provided by the envelope curve (H(j)) are reduced accordingly to the values of the envelope curve (H(j)).

12. A method as claimed in claim 1, characterized in that the error measurement (F(j)) is calculated from the variations between a part of the filter coefficients (ci) of the set of filter coefficients (C(j)), and the values (hi) of the envelope curve (H(j)).

* * * * *

UNITED STATES PATENT AND TRADEMARK OFFICE
CERTIFICATE OF CORRECTION

PATENT NO. : 6,041,290
DATED : March 21, 2000
INVENTOR(S) : Hans Jurgen Matt, Michael Walker, Uwe Ackermann It is certified that error appears in the above-identified patent and that said Letters Patent is hereby corrected as shown below:

In Column 10, claim 9, line 5, "(F(j)" should be --(F(j))--.
In Column 10, claim 10, line 3, "(F(j)" should be --(F(j))--.
In Column 10, claim 10, line 4, "(F(j)" should be --(F(j))--.
In Column 10, claim 10, line 6, "F(j)" should be --(F(j))--.

Signed and Sealed this

Twenty-seventh Day of March, 2001

Attest:

NICHOLAS P. GODICI

Attesting Officer     Acting Director of the United States Patent and Trademark Office